Figure 2:
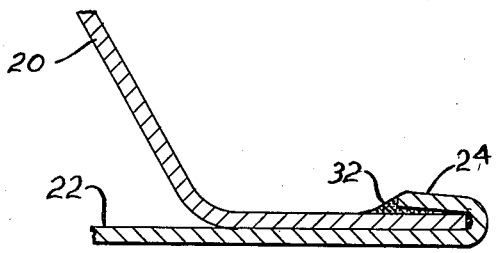

April 8, 1952  H. W. ALEXANDER  2,591,994
PROCESS OF BRAZING THIN BRASS MEMBERS
Filed Oct. 10, 1946

INVENTOR.
Horace W Alexander
BY
Spencer Hardman and Fehr
attorneys

Patented Apr. 8, 1952

2,591,994

UNITED STATES PATENT OFFICE 2,591,994

PROCESS OF BRAZING THIN BRASS MEMBERS

Horace W. Alexander, Oakwood, Ohio, assignor to General Motors Corporation, Dayton, Ohio, a corporation of Delaware Application October 10, 1946, Serial No. 702,502

1 Claim. (Cl. 113—112)

This invention is related to the fabrication of refrigerating apparatus and more particularly to the brazing of containers and metal parts such as may be used in refrigerating apparatus and other applications.

It is an object of my invention to provide an inexpensive brazing process in which the joints are completely sealed so that no crevices remain wherein liquid may collect.

It is another object of my invention to provide a process for sealing joints which can be carried out simultaneously with the customary brazing process.

It is another object of my invention to provide an inexpensive brazing process in which smooth joints are produced.

To attain these objects the metal members are assembled together with the brazing material in between the portions to be brazed. After this a non-fluxing paste, made up largely of powder containing zinc and a non-fluxing adhesive binder, is applied over the open seam or joint. This may be dried, after which the assembly is heated in a reducing or other suitable atmosphere to a temperature sufficient to melt the brazing material to braze the joint and to cause the zinc in the paste nearest the joint to vaporize and reduce the melting point of the adjacent metal so that any crevice may be filled and the joint finished with a smooth fillet and rounded corners.

Further objects and advantages of the present invention will be apparent from the following description, reference being had to the accompanying drawings, wherein a preferred form of the present invention is clearly shown.

Figure 1:
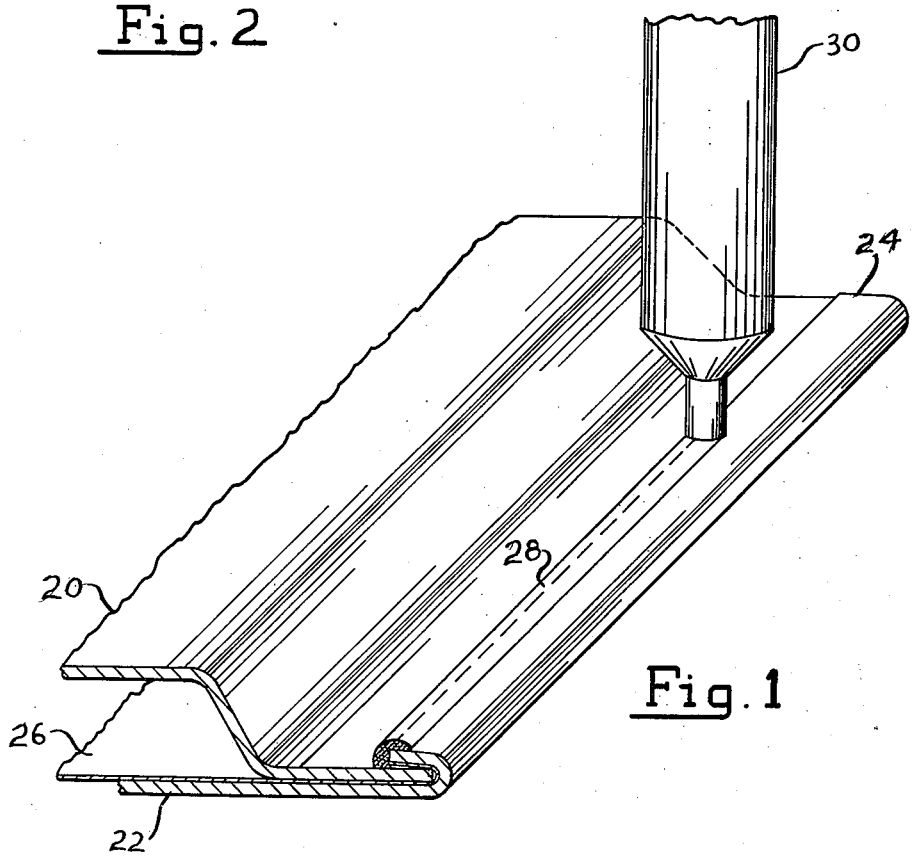

In the drawings:

Fig. 1 is a perspective view, partly diagrammatic, illustrating the application of the paste to the joint; and Fig. 2 is a sectional view through the completed joint.

Referring now to the drawing, and more particularly to Fig. 1, there is shown a portion of a container which is made up principally of two sheet metal members 20 and 22. These sheet metal members 20 and 22 are preferably of a high copper brass, such as a brass or bronze having 80% to 95% copper with a melting point of about 1800° to 1880° F. When the edge of the lower sheet 22 is folded over the edge of the upper sheet 20, the folded-over portion 24 may not lay tight upon the upper sheet 20, but may spring away slightly, leaving a small crevice. Sometimes such a crevice may be formed by stresses during the brazing operation. To accomplish the brazing, it is preferred to use a thin brass spelter sheet 26 in between the upper and lower sheets 20 and 22 which extend between the two sheets 20 and 22 throughout. This spelter sheet is preferably of 60/40 brass containing approximately 60% copper and 40% zinc with a very small amount of phosphorus and having a melting point of about 1660° F.

It was found when this assembly was brazed that frequently the molten brass from the spelter sheet would not completely fill all the crevices which might be formed under the overlapping portion 24 of the sheet 22. Such crevices are undesirable as any one may become a source of trouble in subsequent processing and usage because it can readily trap and hold liquid. Also the sharp projecting edge resulting from the folded-over portion is not altogether satisfactory in appearance.

According to my invention I apply to the joint prior to the brazing a paste made up of brass powder and a non-fluxing vehicle consisting of a non-fluxing organic resin, a plasticizer, a wetting agent, and water. No part of the vehicle should have any appreciable fluxing action. The presence of appreciable amounts of a flux in the vehicle causes the brazing to produce a rough surface. The following formula illustrates one specific example of such a paste:

|  | Pounds |
|---|---|
| Methyl cellulose | 1 |
| Tributyl phosphate | .83 |
| Aerosol OT | .08 |
| Water | 25.8 |
| 60/40 brass powder | 74.5 |

The Aerosol OT is an ester of a sulfonated bicarboxylic acid. The brass powder has a melting point of about 1660° F. This paste 28 is applied from the gun 30 in the form of a quarter-inch bead or ribbon, half of which is laid on the overlapping edge 24 and the other half of which is laid on the upper sheet 20, as shown in Fig. 1. The paste is then allowed to dry.

After drying, the container is placed in a furnace with a reducing atmosphere maintained at a temperature between 1700° F. and 1850° F. and heated to a sufficiently high temperature to cause the spelter sheet to melt and braze the upper and lower sheets 20 and 22 together at their contacting portions.

At the same time the brass powder in the paste releases metallic zinc vapor in sufficient concentration to protect the portion of the brass powder nearest the joint from excessive loss of zinc and consequent elevation of its melting point.

By virtue of this, the low melting point brass powder nearest the joint is enabled to melt at the temperatures attained to supply molten metal for filling the joint. This zinc vapor concentration also causes the zinc to diffuse into the adjacent high melting point base metal to reduce its melting point to such an extent that the sharp corners of the overlapping joint melt away at the temperatures attained and become rounded, thereby furnishing additional molten metal to close the joint and provide a smooth fillet. The corner of the overlapping portion 24 becomes slightly rounded due to this operation and the molten brass forms a smooth fillet 32 along the edge of the overlapping portion 24 as shown in Fig. 2. Due to the non-fluxing action of the vehicle, the residue of the paste which has served to confine the zinc vapor, may be readily brushed away after brazing to leave the smooth fillet.

This provides a smooth joint of satisfactory appearance without any crevices or voids which might trap liquids. It is not necessary to use the exact ingredients mentioned for the paste. For example, the smoothness of the joint may be controlled by varying the concentration of the zinc vapor at the joint. This may be done by varying the confining properties of the paste, by varying the composition of the vehicle or more conveniently by varying the zinc content in the brass powder used in the paste from 30% to 50% zinc or by using a zinc powder. Either powder may contain a small amount of phosphorus. Other materials may be used as the adhesive and plasticizer. It is, however, necessary that they leave no objectionable residue which cannot be readily removed. They however must adhere to the evaporator before brazing so as to permit handling, and the paste must not shrink excessively during drying and brazing.

In any event, the paste must not contain any appreciable amounts of a flux which becomes liquid during brazing. It is not necessary to use a reducing atmosphere if the action of an oxidizing or neutral atmosphere upon the base material is unobjectionable. If the volatile products of the vehicle are unobjectionable in the furnace atmosphere, it may be unnecessary to dry the paste before placing the container in the furnace.

If the part to be joined need be brazed only at the joint, the usual brazing material may be omitted between the parts to be joined. The paste above referred to is applied to the joint in the usual manner and will then furnish the brazing material to braze the joint and at the same time will provide the confining covering for the zinc vapor, so that a smooth filleted joint is made. Due to the non-fluxing action of the paste, there is no danger that any flux may flow and lodge in the interior of any container.

While I have illustrated the invention as applied to a container of a particular brass composition and a particular spelter sheet my invention may be applied to other forms of brazing in which copper or silver are present.

While the form of embodiment of the invention as herein disclosed, constitutes a preferred form, it is to be understood that other forms might be adopted, as may come within the scope of the claim which follows.

What is claimed is as follows:

The process of brazing thin brass members together to make a fluid-tight joint between them which includes placing a thin brass brazing sheet material between the portions of the brass members to be joined including an edge portion, folding an edge portion of one of the brass members over an edge portion of the second brass member to clamp the brass members together with the brazing sheet material in between leaving a slight crevice between the folded over portion and the adjacent portion of the second member, applying a uniformly heaping quantity of a substantially non-fluxing paste of a substantially uniform composition containing substantially non-fluxing methyl cellulose and a substantial portion of brass powder having a 30–50% zinc content over the exterior mouth of the crevice and the adjacent exposed exterior edge portion throughout the length of the joint, and heating the assembly in a non-oxidizing atmosphere for a sufficient length of time at a sufficient temperature to cause the brazing sheet material to fuse together the adjacent portions of the brass members while excessive distillation of zinc from the brazing material is prevented by preventing the free escape of zinc vapor by the location of the heaping quantity of the non-fluxing paste at the mouth of the crevice and to cause the brass powder to melt and flow into and fill the slight crevice beneath the folded over portion.

HORACE W. ALEXANDER.

REFERENCES CITED

The following references are of record in the file of this patent:

UNITED STATES PATENTS

| Number | Name | Date |
|---|---|---|
| 2,067,208 | Schweller | Jan. 12, 1937 |
| 2,071,583 | Schutt | Feb. 23, 1937 |
| 2,085,313 | Guthrie | June 29, 1937 |
| 2,117,106 | Silliman | May 10, 1938 |
| 2,232,176 | Guthrie | Feb. 18, 1941 |
| 2,275,112 | Shippy | Mar. 3, 1942 |

FOREIGN PATENTS

| Number | Country | Date |
|---|---|---|
| 415,181 | Great Britain | Aug. 23, 1934 |

OTHER REFERENCES

Engineering Alloys, Woldman & Metzler, 1945, published by Amer. Soc. for Metals, pg. 208.

Welding Handbook, 1942 ed. pub. by Amer. Welding Society, pgs. 595–596–597.